3,068,111
PAINT COLORANT
Robert D. Seymour, Snyder, N.Y., assignor to National Gypsum Company, Buffalo, N. Y., a corporation of Delaware
No Drawing. Filed Dec. 17, 1959, Ser. No. 860,092
23 Claims. (Cl. 106—177)

The present invention is directed to a paint colorant or tinting composition, and particularly to a colorant of water dispersible pigments adapted for use in either water or oil based paints, and to the method of making said composition. This application is a continuation-in-part of my co-pending application, Serial No. 657,511, filed May 7, 1957, now abandoned.

Paint colorants are commonly used by paint manufacturers in final color adjustment of batches in process, and more recently are being used by paint applicators to tint paints to a desired color. The preparation of such colorants has heretofore required substantial grinding or milling for satisfactory dispersion of pigments.

It has been found that a satisfactory colorant can be manufactured, in accordance with the present invention, which requires in its preparation only the reasonable mixing of ingredients by suitable agitation. It is accordingly an object of the present invention to provide a colorant composition susceptible to such improved and simplified preparation procedure.

It is a further object of the invention to provide an improved colorant that is suitable for use in any of the usual types of coating compositions, particularly alternatively water or oil based paints.

A further object of the invention is to provide a colorant of improved stability, being substantially free of flocculation and color drift after many months of storage.

A still further object is to provide a colorant with a high degree of odor absorbing properties, to thus improve the characteristics of a paint with which such colorant is used.

These and other objects and advantages of the invention will be more apparent when considered in connection with the following description of the invention and the preferred embodiments thereof.

EXAMPLE I

The preferred embodiment of the present invention, with red iron oxide as an example of the pigments to be employed, is set forth as follows:

| | Lbs. |
|---|---|
| Red oxide (C. K. Williams R–1599) | 500 |
| Lecithin (soya) | 45 |
| Dibutyl phthalate | 70 |
| Diacetone alcohol | 35 |
| Methyl cellulose (3% solution) | 35 |
| Water | 315 |
| | 1000 |

The colorant of Example I is prepared by first mixing the water and lecithin, until the lecithin is dispersed into the water. The pigment, of commonly available sub-micron grade, is added and mixed therein by thorough agitation, until no flocculation can be noted when floating a sample on a stream of tap water. Approximately twenty minutes of mixing is sufficient in the preparation of the colorant of Example I.

The proportion of dibutyl phthalate to diacetone alcohol will be seen to be 2:1. This particular ratio, the control of which has been found to be essential in accordance with the invention should be maintained within the range of 1:1 to 3:1. These two ingredients are pre-mixed to provide 105 pounds of additive, and are, thus, added to the pigment slurry.

The 3% methyl cellulose solution is added to provide the desired gelatinous character to the finished colorant.

EXAMPLE II

Providing an alternative to the additive of Example I, the following formulation may be prepared by a similar process:

| | Lbs. |
|---|---|
| Red oxide | 500 |
| Lecithin | 45 |
| Dimethoxyethyl phthalate | 70 |
| Acetone | 35 |
| Methyl cellulose (3% aqueous solution) | 35 |
| Water | 315 |
| | 1000 |

With both forms of the additive hereinabove disclosed, a generally similar action is obtained. The invention is considered to provide an improved dispersing and stabilizing action, in a particular resultant dipolar composition to be employed in either water or oil based paints.

EXAMPLE III

The formulations of Examples I and II are suitable, as disclosed, for addition to water based paints. When use of these formulations with oil based paints is desired, a 1:1 dilution of the colorant with the particular dipole used, diacetone alcohol or acetone, is desirable, i.e., to the mixture of Example I add an additional 1000 pounds of diacetone alcohol to adapt the colorant for use with oil based paints. This addition can only be satisfactorily made after the completion of the preparation process discussed under Example I.

EXAMPLE IV

The solids content can be considerably increased by the further addition, of up to a total of 1200 pounds, of red oxide in Example I; however, colorants with this increase in solids, over the proportions of Example I, have been found to be proportionally more difficult to manufacture and to maintain with the proper dispersion of the pigments, while avoiding the so-called grinding procedure as desired in accordance with the invention.

EXAMPLE V

Before substituting other pigments of the oxide class into Example I, consideration should be given to the bulking properties of the particular pigment. While the above examples employing red oxide are typical of the oxide pigments of relatively heavy bulking value, yellow iron oxide, such as C. K. Williams YLO 1788, typify the oxide pigments of relatively lower pigment bulking value. A preferred form of the yellow colorant is provided by replacing the 500 pounds of red oxide of Example I with 400 pounds of yellow iron oxide. Here again, higher proportions of pigment may be used if careful control is practiced in the preparation, and lower proportions may be used with resultant proportionally lower pigment opacity when extended into a coating.

EXAMPLE VI

Considering organic pigments, it is usually essential that the pigments be obtained in a pure condition, that is, without previously added dispersing or wetting agents. The following is a preferred formulation incorporating pure phthalocyanine blue in a colorant of the invention:

|  | Lbs. |
| --- | --- |
| Pure phthalocyanine blue | 360 |
| Lecithin | 45 |
| Dibutyl phthalate | 90 |
| Diacetone alcohol | 45 |
| Alkyl aryl polyethylene glycol | 25 |
| Methyl alcohol (95% alcohol) | 95 |
| Water | 380 |
|  | 1040 |

EXAMPLE VII

Similarly, the following is a preferred formulation of the colorant with pure lamp black:

|  | Lbs. |
| --- | --- |
| Pure lamp black | 360 |
| Lecithin | 45 |
| Dibutyl phthalate | 90 |
| Diacetone alcohol | 45 |
| Alkyl aryl polyethylene glycol | 25 |
| Methyl alcohol | 95 |
| Water | 380 |
|  | 1040 |

The preparation of the colorants having organic pigments is similar to that of the oxide pigments, with a nonionic surface active agent, such as alkyl aryl polyethylene glycol, and methyl alcohol replacing the methyl cellulose.

EXAMPLE VIII

Although lecithin has been found to be the preferred dispersing agent for reasons of both economy and efficiency in the forming of the initial dispersion to be stablized in accordance with the invention, any dispersing agent capable of providing the desired quality of initial dispersion which is compatible with system will provide a dispersion which may be similarly stabilized, for retaining the dispersion, in accordance with the invention. For example, the following formulation is set forth including as the dispersing agent the sodium salt of polymethacrylic acid:

|  | Lbs. |
| --- | --- |
| Red oxide | 500 |
| Sodium salt of polymethacrylic acid | 45 |
| Dibutyl phthalate | 70 |
| Diacetone alcohol | 35 |
| Methyl cellulose (3% aqueous solution) | 35 |
| Water | 315 |
|  | 1000 |

Other dispersing agents which when used result in dispersion of poorer quality may, of course, be also stabilized in accordance with the invention whereby a dispersion will be maintained substantialy equal to the quality of the initial dispersion formed.

Summary

All forms of the present invention will be seen to be used as a combination, in a relatively highly pigmented composition, of a water soluble compatible dispersing agent and a pre-mixed additive of either dibutyl phthalate and diacetone alcohol or dimethoxyethyl phthalate and acetone. The additive, in either form, is preferably used in a proportion of phthalate to acetone respectively of 2:1, however, it has been found that the invention may be practiced to some degree with proportions respectively from 1:1 to 3:1.

The above additives will be seen to be combined with the dispersing agent in a preferred ratio in the order of 9:4, however, this ratio may be varied from about 7:4 to 12:4.

The amount of water employed in the above examples is directed to obtaining a particular desired consistency of resultant colorant composition, and may be varied within reasonable tolerances to vary such consistency when desired. The amount of water could be substantially reduced and the methyl cellulose could, in accordance with the invention, be eliminated, if an entire batch of colorant were to be used immediately on completion of preparation; however, such a condition would be rather unusual since, in common practice, the colorant is stored for considerable periods of time.

Other gelling or suspending agents may be employed, in place of methyl cellulose, such as sodium polyacrylate, modified starch, carboxymethyl cellulose, vegetable gums, alginates, or polyvinyl alcohol. With the use of suitable gelling agents, the novel colorants have been found to undergo a slight gelatinous settling in one year, but the settled matter can be easily redispersed by slight mixing with the supernatant liquid floating thereabove. This very extensive shelf life attests to the completeness of the dispersion which has been originally produced without grinding and by only thorough agitation of dry pigments into the slurry.

Coatings prepared by incorporating substantial amounts of colorant prepared in accordance with the invention have been subjected to all of the usual quality comparison tests for such coatings and have been found to be completely comparable to coatings pigmented by conventional grinding procedures.

The coating compositions incorporating the novel colorant have been found to provide a relatively odor-free coating composition as compared to the same coating composition without such a colorant.

Having completed a detailed disclosure of the preferred embodiments of my invention so that those skilled in the art may practice the same, I contemplate that variations may be made without departing from the essence of the invention or the scope of the appended claims.

I claim:

1. A pigment dispersion stabilizer of the group consisting of a mixture of dibutyl phthalate and diacetone alcohol and a mixture of dimethoxyethyl phthalate and acetone, the proportion of phthalate compound to acetone compound in said composition being from 1:1 to 3:1.

2. A pigment dispersion stabilizer consisting essentially of a mixture of from 1 to 3 parts of dibutyl phthalate and 1 part diacetone alcohol.

3. A pigment dispersion stabilizer consisting essentially of a mixture of from 1 to 3 parts of dimethoxyethyl phthalate and 1 part acetone.

4. An aqueous tinting composition comprising a submicron grade pigment, a stabilizer mixture additive of the group consisting of a mixture of dibutyl phthalate and diacetone alcohol and a mixture of dimethoxyethyl phthalate and acetone, the proportion of phthalate compound to acetone compound in said composition being from 1:1 to 3:1, a pigment dispersing agent and sufficient water to provide a slurry of workable consistency.

5. As an article of manufacture, an aqueous tinting composition comprising from 1 to 1200 parts by weight of sub-micron grade pigment dispersed in an aqueous solution comprising 100 parts by weight of a stabilizer mixture additive of the group consisting of a mixture of dibutyl phthalate and diacetone alcohol and a mixture of dimethoxyethyl phthalate and acetone, the proportion of phthalate compound to acetone compound in said mixture additive being from 1:1 to 3:1, and sufficient water to make a slurry of workable consistency.

6. As an article of manufacture, an aqueous tinting composition comprising from 1 to 1200 parts by weight of sub-micron grade pigment, from 40 to 60 parts by weight of a water soluble, compatible pigment dispersing agent, from about 100 to 140 parts by weight of a stabilizer mixture additive of the group consisting of a mixture of dibutyl phthalate and diacetone alcohol and a mixture of dimethoxyethyl phthalate and acetone, the proportion of phthalate compound to acetone compound in said mixture additive being from 1:1 to 3:1, and sufficient water to make a slurry of workable consistency.

7. As an article of manufacture, an aqueous tinting composition comprising from 1 to 1200 parts by weight of sub-micron grade pigment, from 40 to 60 parts by weight of lecithin, from about 100 to 140 parts by weight of a stabilizer mixture additive of the group consisting of a mixture of dibutyl phthalate and diacetone alcohol and a mixture of dimethoxyethyl phthalate and acetone, the proportion of phthalate compound to acetone compound in said mixture additive being from 1:1 to 3:1, and sufficient water to make a slurry of workable consistency.

8. As an article of manufacture, an aqueous tinting composition comprising from 1 to 1200 parts by weight of sub-micron grade inorganic pigment, from 40 to 60 parts by weight of a water soluble compatible pigment dispersing agent, from about 100 to 140 parts by weight of a stabilizer mixture additive of the group consisting of a mixture of dibutyl phthalate and diacetone alcohol and a mixture of dimethoxyethyl phthalate and acetone, the proportion of phthalate compound to acetone compound in said mixture additive being from 1:1 to 3:1, a minor proportion of gelling agent of the class consisting of methyl cellulose, sodium polyacrylate, modified starch, carboxymethyl cellulose, vegetable gums, alginates and polyvinyl alcohol, and sufficient water to make a slurry of workable consistency.

9. As an article of manufacture, an aqueous tinting composition comprising from 1 to 1200 parts by weight of sub-micron grade, substantially pure, organic pigment, from 40 to 60 parts by weight of a water soluble compatible pigment dispersing agent, from about 100 to 140 parts by weight of a stabilizer mixture additive of the group consisting of a mixture of dibutyl phthalate and diacetone alcohol and a mixture of dimethoxyethyl phthalate and acetone, the proportion of phthalate compound to acetone compound in said mixture additive being from 1:1 to 3:1, a minor proportion of non-ionic surface active agent and methyl alcohol, and sufficient water to make a slurry of workable consistency.

10. As an article of manufacture, an aqueous tinting composition comprising from 1 to 1200 parts by weight of sub-micron grade pigment, from 40 to 60 parts by weight of a water soluble compatible pigment dispersing agent, from about 100 to 140 parts by weight of a stabilizer mixture additive of dibutyl phthalate and diacetone alcohol, the proportion of dibutyl phthalate to diacetone alcohol being from 1:1 to 1:3, and sufficient water to make a slurry of workable consistency.

11. As an article of manufacture, an aqueous tinting composition comprising from 1 to 1200 parts by weight of sub-micron grade pigment, from 40 to 60 parts by weight of a water soluble compatible pigment dispersing agent, from about 100 to 140 parts by weight of a stabilizer mixture additive of dimethoxyethyl phthalate and acetone, the proportion of dimethoxyethyl phthalate to acetone being from 1:1 to 1:3, and sufficient water to make a slurry of workable consistency.

12. The aqueous tinting composition of claim 7, having an additional amount of said acetone compound substantially equal in parts by weight to the total parts by weight of said composition defined in claim 7, whereby said composition is suitable for use in oil based paints.

13. The aqueous tinting composition of claim 10, having an additional amount of diacetone alcohol, substantially equal in parts by weight to the total parts by weight of said composition defined in claim 10, whereby said composition is suitable for use in oil based paints.

14. The aqueous tinting composition of claim 11, having an additional amount of acetone, substantially equivalent in parts by weight to the total parts by weight of said composition defined in claim 11, whereby said composition is suitable for use in oil based paints.

15. The method of adjusting the tint of a paint by a method which includes the addition of sub-micron grade pigment which comprises introducing to the paint, whose color is to be modified, a tinting composition which includes a tinting sub-micron grade pigment dispersed in a solution of a pigment dispersion stabilizing agent of the group consisting of a mixture of dibutyl phthalate and diacetone alcohol and a mixture of dimethoxyethyl phthalate and acetone, the proportion of phthalate compound to acetone compound in said agent being from 1:1 to 3:1, and a stable pigment dispersing agent in a liquid compatible with the paint vehicle and mixing the tinting composition with the paint without substantial milling or grinding to produce a stable paint composition of modified color.

16. The method of making a tinting composition comprising the steps of thoroughly mixing by agitation water, from 40 to 60 parts by weight of a water soluble compatible pigment dispersing agent and from 1 to 1200 parts by weight of sub-micron grade pigment and mixing with said mixture from about 100 to 140 parts by weight of a pre-mixed stabilizer additive of the group consisting of a mixture of dibutyl phthalate and diacetone alcohol and a mixture of dimethoxyethyl phthalate and acetone, the proportion of phthalate compound to acetone compound in said additive being from 1:1 to 3:1.

17. The method of making a tinting composition comprising the steps of thoroughly mixing by agitation water, from 40 to 60 parts by weight of lecithin and and from 1 to 1200 parts by weight of sub-micron grade pigment, and mixing with said mixture from about 100 to 140 parts by weight of a pre-mixed stabilizer additive of the group consisting of a mixture of dibutyl phthalate and diacetone alcohol and a mixture of dimethoxyethyl phthalate and acetone, the proportion of phthalate compound to acetone compound in said additive being from 1:1 to 3:1.

18. The method of claim 16 wherein said pre-mixed additive is a mixture of dibutyl phthalate and diacetone alcohol.

19. The method of claim 16 wherein said pre-mixed additive is a mixture of dimethoxyethyl phthalate and acetone.

20. In the method of claim 16, the further mixing therewith of an additional amount of said acetone compound substantially equal in parts by weight to the total parts by weight of said composition formed by the method of claim 16.

21. In the method of claim 17, the further mixing therewith of an additional amount of said acetone compound substantially equal in parts by weight to the total parts by weight of said composition formed by the method of claim 17.

22. In the method of claim 18, the further mixing therewith of an additional amount of said acetone compound substantially equal in parts by weight to the total parts by weight of said composition formed by the method of claim 18.

23. In the method of claim 19, the further mixing therewith of an additional amount of said acetone compound substantially equal in parts by weight to the total parts by weight of said composition formed by the method of claim 19.

References Cited in the file of this patent

UNITED STATES PATENTS

| | | |
|---|---|---|
| 2,130,554 | Lusseyran | Sept. 20, 1938 |
| 2,809,122 | Willis et al. | Oct. 8, 1957 |

OTHER REFERENCES

Smith: Canadian Paint and Varnish Magazine, December 1953, pages 10, 12, 50 and 51.